United States Patent Office 2,786,392
Patented Mar. 26, 1957

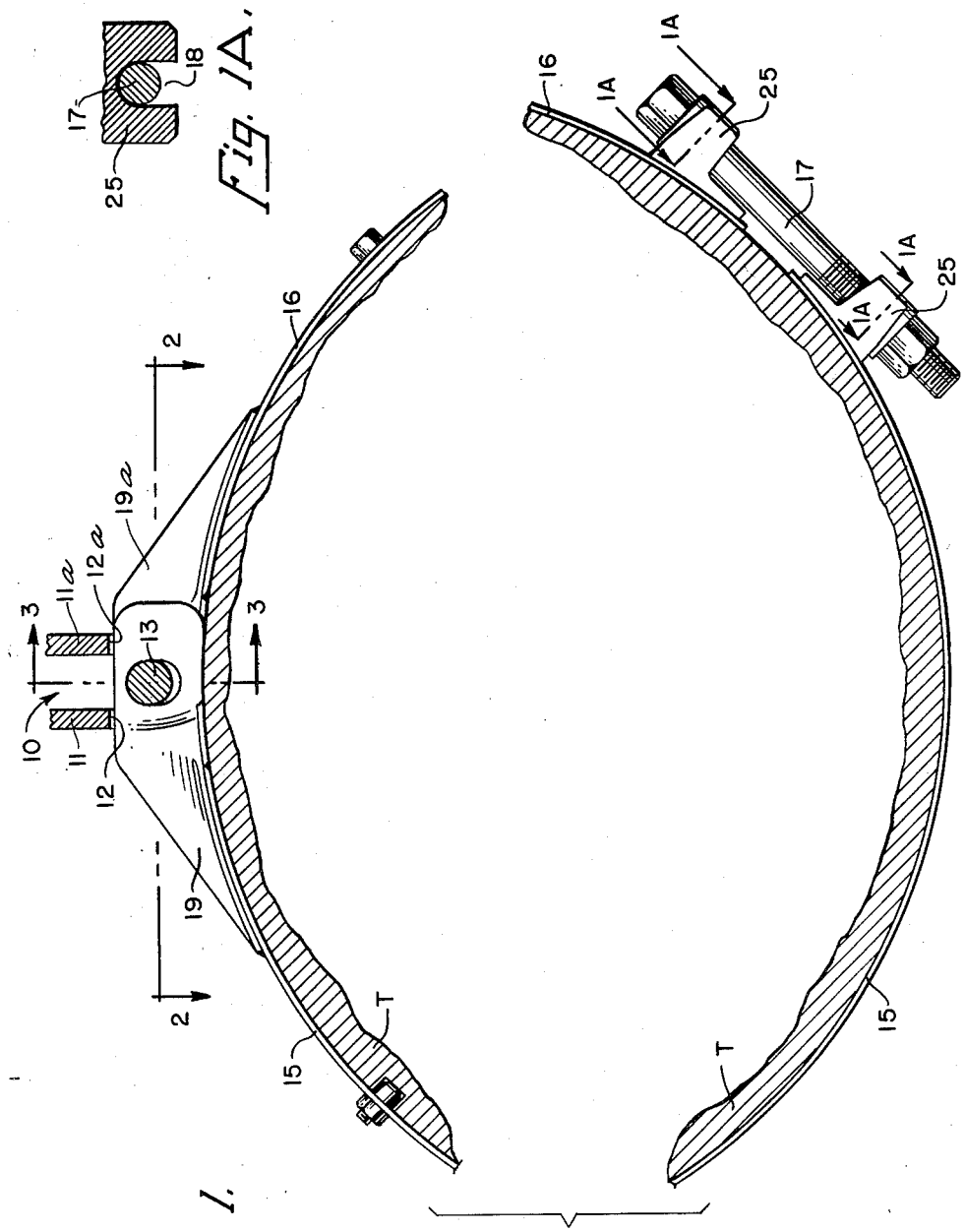
March 26, 1957 — H. J. NIEDLING — 2,786,392
BREAKAWAY SUSPENSION BAND
Filed Dec. 4, 1952 — 2 Sheets-Sheet 1
INVENTOR.
HERMAN J. NIEDLING
BY
ATTORNEYS March 26, 1957 H. J. NIEDLING 2,786,392
BREAKAWAY SUSPENSION BAND
Filed Dec. 4, 1952 2 Sheets-Sheet 2
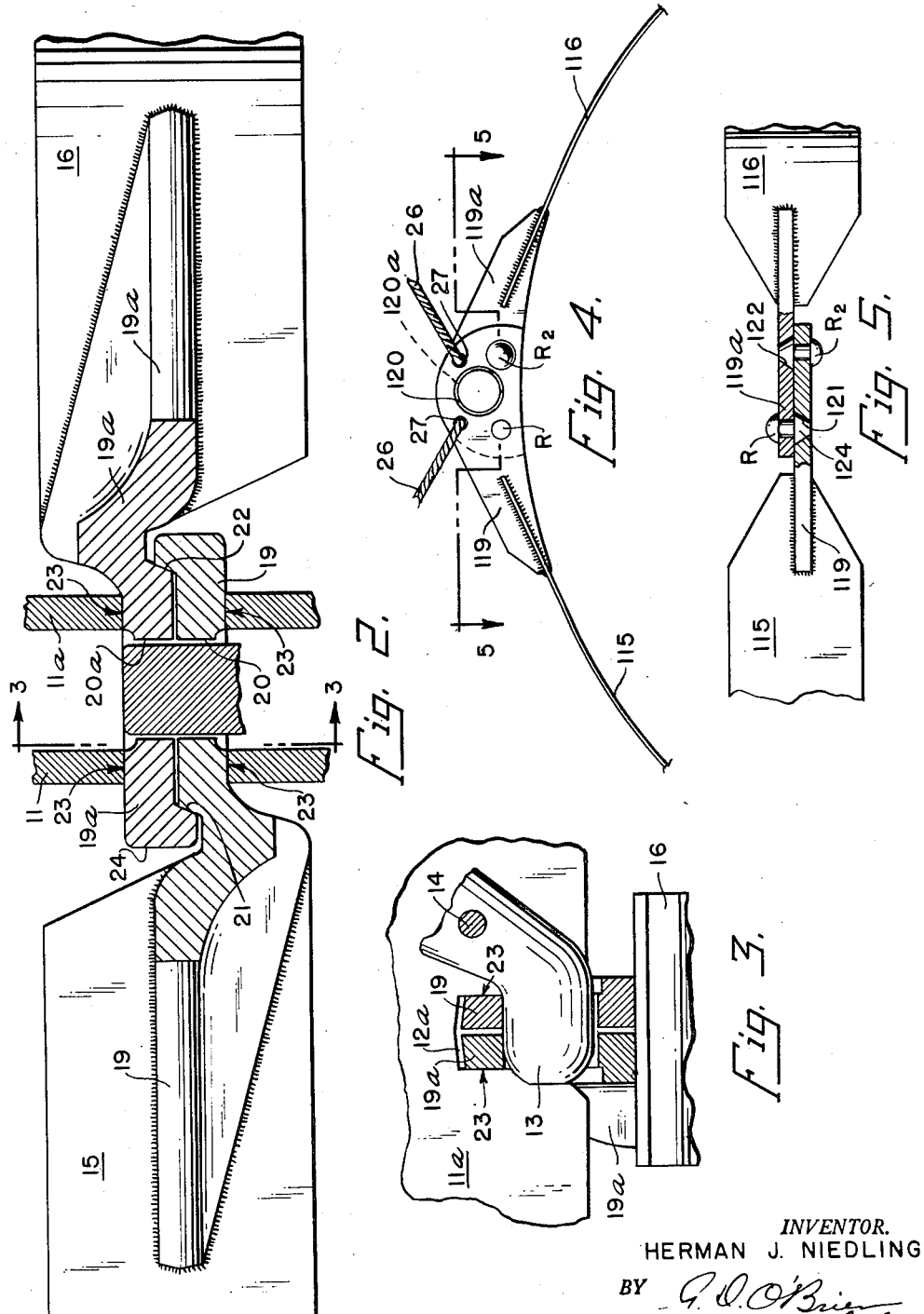
INVENTOR.
HERMAN J. NIEDLING
BY
ATTORNEYS

2,786,392

BREAKAWAY SUSPENSION BAND

Herman Joseph Niedling, Avondale, Md., assignor to United States of America as represented by the Secretary of the Navy Application December 4, 1952, Serial No. 324,161

4 Claims. (Cl. 89—1.5)

(Granted under Title 35, U. S. Code (1952), sec. 266)

The invention described herein may be manufactured and used by or for the Government of the United States of America for governmental purposes without the payment of any royalties thereon or therefor.

This invention relates to launching apparatus for aircraft carried missiles and more particularly to breakaway suspension bands adapted to support a missile from an aircraft bomb rack and separate from the missile after the latter has been released from the bomb rack.

One of the objects of the invention is to provide an improved tensioned encircling band for a missile, such as a torpedo, which will automatically disengage from the torpedo after the latter has been released from an aircraft and fall independently of the torpedo to thereby permit the torpedo to make its run through the water without water drag or sonic interference of the band which would otherwise occur if the band remained affixed to the torpedo during such run.

Another object is to provide a breakaway band for use with a conventional aircraft bomb rack which cooperates with the rack in a novel manner.

Another object is to provide a breakaway band with a pair of lugs at the upper terminal ends thereof having camming surfaces thereon which are maintained in engagement when the missile is supported from the rack but which automatically disengage due to the tension in the band when the missile is released from the rack.

Other objects and many of the attendant advantages of this invention will be readily appreciated as the same becomes better understood by reference to the following detailed description when considered in connection with the accompanying drawings wherein:

Fig. 1 is a fragmentary section taken in a plane perpendicular to the longitudinal axis of a torpedo and bomb rack, showing the subject of the invention applied thereto;

Fig. 1A is a section taken on lines 1A, 1A Fig. 1;

Fig. 2 is an enlarged section taken on line 2—2, Fig. 1;

Fig. 3 is a section taken on line 3—3, Figs. 2 and 3;

Fig. 4 is a fragmentary side elevation, similar to Fig. 1, showing an alternative form of the invention; and Fig. 5 is a section taken on line 5—5, Fig. 4.

Referring in detail to the drawing, and particularly Figs. 1 to 3, conventional bomb rack 10, previously referred to, comprises a pair of spaced parallel rails 11, 11a, having downwardly opening slots 12, 12a, respectively, and a hook 13, pivoted between the rails on pivot pin 14. Similar slots and a similar hook are provided at a second longitudinally spaced point on the rack (not shown) so that the pair of hooks support the missile at longitudinally spaced points along the latter.

The breakaway band comprises two band-like members 15, 16 which encircle the torpedo T and which are tensioned by a connecting bolt 17 extending through open slots 18, 18 in lugs 25, 25 rigidly affixed to each of the members.

Suspension members 19, 19a are secured to the upper free ends of members 15, 16, respectively, as by welding, and are provided with aligned apertures 20, 20a, respectively, through which hook 13 extends.

As best shown in Fig. 2, members 19, 19a are constructed to engage each other along camming surfaces 21, 22, the angles of which are so chosen that a tension in the band tends to spread the members away from each other. While disposed within the slots of the bomb rack, however, they are prevented from separation by the restraint of confronting faces of each slot as illustrated by arrows 23.

In the operation of the construction so far described, members 19, 19a, with their attached bands are disposed within the slots of the bomb rack and the hook moved to the position shown in the figures. As will be understood, a second pair of similar band members are disposed within the slots and in cooperative engagement with a hook at a spaced point longitudinally along the rack. With bolts 17 removed, the torpedo or other missile is raised into place and the bolts inserted between lugs 25. The bolts are then tightened to provide tension in the band. When hooks 13 are moved to a position out of engagement with the aligned apertures in the lugs the missile and bands fall from the rack and since the lugs are no longer restrained, as indicated by arrows 23, the lugs spread apart and the bands fall free of the missile.

Figs. 4 and 5 illustrate an alternative form of the invention. In this construction a rivet R having a frusto-conical projection 124 is secured to lug 119a, the projection being disposed in a frusto-conical aperture in member 119. A similar rivet R₂ is secured to member 119 and similarly engages in a similar aperture in member 119a. As will be apparent, these projections provide camming surfaces 121, 122, similar, respectively, to surfaces 21, 22 described in the first embodiment of the invention. As best shown in Fig. 4, lugs 119 and 119a are provided with similar aligned apertures 120, 120a for receiving hook 13 and when this hook is withdrawn from these apertures, thus removing the restraint of confronting faces of the bomb rack notches, the tension in the band and the action of the camming surfaces 121, 122 effect separation of the band from the missile.

Lugs 119, 119a are retained together during transportation and handling by lash wires 26, 26 which extend through aligned pairs of apertures 27, 27 in lugs 119, 119a. When the bands are disposed on the bomb rack these wires are removed. As will be apparent, similar lash wires may be employed with the construction in Figs. 1 to 3.

Obviously many modifications and variations of the present invention are possible in the light of the above teachings. It is therefore to be understood that within the scope of the appended claims the invention may be practiced otherwise than as specifically described.

I claim:

1. Apparatus for suspending and launching a missile from an aircraft bomb rack of the type having a downwardly open notch having spaced upwardly directed confronting faces, and a movable hook associated with the notch for retaining a missile suspended thereby, comprising; a flexible tensioned breakaway band adapted to substantially encircle the missile, the upper free ends of the band each having a suspension member rigidly affixed thereto, the suspension members being disposed in lapped relationship, at least one of the suspension members having an aperture therethrough for receiving said hook, disengageable cooperating surfaces on the members adapted to maintain them in predetermined lapped relationship when disposed in the notch and with each member in engagement with a confronting face of the notch, to thereby prevent separation of the suspension members, said cooperating surfaces being shaped to effect separation of the suspension members, by the tension in the band, when the suspension members are released from the restraint of the confronting faces of the notch.

2. Apparatus in accordance with claim 1 wherein both of said suspension members are provided with hook receiving apertures.

3. Apparatus for suspending and launching a missile from an aircraft bomb rack of the type having a downwardly open notch and a movable hook underlying same, comprising; a flexible tensioned band adapted to substantially encircle the missile, the upper ends of the band each having a support member rigidly affixed thereto, the members being disposed in lapped relationship and having aligned apertures therethrough for receiving the hook, disengageable cooperating surfaces on the members adapted to maintain them in predetermined lapped relationship when disposed in the notch with said apertures in alignment, and for transferring tensional force in the band therebetween without applying said force to the hook, said surfaces being shaped to separate when the members are released from restraint of confronting spaced surfaces of the notch.

4. In apparatus for suspending a missile from an aircraft bomb rack of the type having a downwardly open notch with spaced upwardly directed confronting faces, and a movable hook associated with the notch for retaining a missile suspended thereby, comprising; a tensioned flexible breakaway band adapted to encircle the missile, the upper ends of the band each having a support member rigidly affixed thereto, the support members being in lapped relationship and having aligned apertures for receiving the hook, each member having a surface adapted to engage a confronting face of the notch, whereby the confronting faces of the notch limit the extent of separation of the members, the members having cooperating engaging surfaces thereon adapted to transfer tension in the band therebetween, said surfaces being shaped to effect separation of the members when the latter are released from the restraint of the confronting faces of the notch.

References Cited in the file of this patent

UNITED STATES PATENTS

| 1,529,962 | Pantoflicek | Mar. 17, 1925 |
| 2,379,364 | Leland | June 26, 1945 |
| 2,389,202 | Leland | Nov. 20, 1945 |
| 2,392,400 | Neff | Jan. 8, 1946 |
| 2,395,913 | Schultze | Mar. 5, 1946 |
| 2,434,162 | Imber | Jan. 6, 1948 |
| 2,462,744 | Hasselhorn | Feb. 22, 1949 |
| 2,690,122 | Darnall et al. | Sept. 28, 1954 |

FOREIGN PATENTS

| 158,580 | Great Britain | Feb. 17, 1921 |